United States Patent [19]
Watson

[11] 4,049,223
[45] Sept. 20, 1977

[54] CONSTANT ALTITUDE AUTO PILOT CIRCUIT

[75] Inventor: William S. Watson, Tucson, Ariz.

[73] Assignee: The United States of America as represented by the Secretary of the Navy, Washington, D.C.

[21] Appl. No.: 699,007

[22] Filed: June 21, 1976

[51] Int. Cl.² ............................................. G05D 1/08
[52] U.S. Cl. .................................. 244/180; 307/230; 318/584; 328/142
[58] Field of Search ............... 73/178 R; 235/150.2, 235/150.22; 244/180, 183, 185–188, 196, 197; 307/229, 230; 318/584, 591; 328/142; 340/27; 343/12 A

[56] References Cited

U.S. PATENT DOCUMENTS

| | | | |
|---|---|---|---|
| 3,504,267 | 3/1970 | James et al. | 307/229 X |
| 3,638,092 | 6/1972 | Kammerer | 318/591 X |
| 3,742,325 | 6/1973 | Andresen, Jr. | 318/584 X |
| 3,845,398 | 10/1974 | Katz | 307/229 X |
| 3,934,222 | 1/1976 | Bateman et al. | 244/180 X |
| 3,940,673 | 2/1976 | Darlington | 244/180 X |

Primary Examiner—Stephen G. Kunin

[57] ABSTRACT

A constant altitude auto pilot circuit samples an altitude electronically and produces error output voltages proportional to the changes in altitude which are used to command the control system of an aircraft. To set the device, the plane obtains the desired altitude whereafter the device is activated. A switch in parallel with an op-amp is closed to charge a capacitor to a voltage level proportional to the output of a transducer. When the switch is opened, all inputs to the op-amp become relative to the charge of the capacitor. Any variation is amplified by the op-amp. Additional inputs allow biasing the altitude signal up or down or introducing a damping signal for control loop stability.

4 Claims, 2 Drawing Figures

CONSTANT ALTITUDE AUTO PILOT CIRCUIT

BACKGROUND

This invention pertains to control systems for maintaining an aircraft at a constant altitude. One type of aircraft altitude control system provides for the voltage output of an altitude transducer to be compared to a reference voltage and the difference to be amplified and then applied to the control system. Drift and uncalibration of the altitude sensor and/or the voltage reference and an uncertainty in barometric pressure compensation cause an unreliability in presetting the voltage reference for a desired altitude.

SUMMARY OF THE INVENTION

The invention samples an altitude electronically and produces error output voltages proportional to the changes in altitude which are used to command the control system of an aircraft. A plane obtains the desired altitude whereafter the device is activated. A switch in parallel with an op-amp is closed to charge a capacitor to a voltage level proportional to the output of a transducer. When the switch is opened, all inputs to the op-amp become relative to the charge of the capacitor. Any variation is amplified by the op-amp. Means are also disclosed for biasing the altitude signal and for introducing damping signals to provide control loop stability.

STATEMENT OF THE OBJECTS OF THE INVENTION

An object of the invention is to provide an inexpensive and compact constant altitude auto pilot.

Another object of the invention is to provide a constant altitude auto pilot which requires no calibration or adjustment except adjustments for varying control loop conditions.

Other objects, advantages and novel features of the invention will become apparent from the following detailed description of the invention when considered in conjunction with the accompanying drawings.

DESCRIPTION OF THE PREFERRED EMBODIMENT

Figure 1:
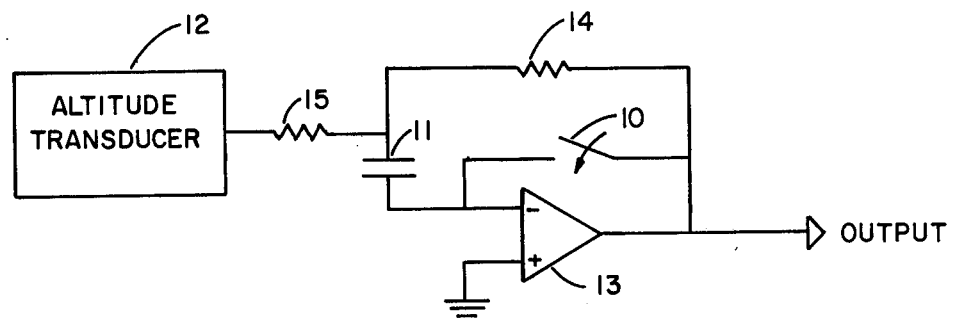
FIG. 1 is a circuit schematic of a constant altitude auto pilot.

In FIG. 1, when switch 10 is closed, capacitor 11 is charged to a voltage proportionate to the output of transducer 12 by the operating characteristics of operational amplifier 13. When an altitude hold command is given, switch 10 is opened and the voltage held by capacitor 11, which represents the initial altitude including effects of barometric pressure and calibration errors, is in series with and therefore, subtracted from, the present altitude signal. The remaining error is amplified by the operational amplifier 13 at a gain determined by the ratio of resistor 14 to resistor 15. The long term stability of the invention requires the capacitor to be a low leakage type such as the styrene variety and the operational amplifier to be a high impedance input type such as a MOS FET input variety such that the reference voltage does not bleed off at a debilitating rate.

Figure 2:
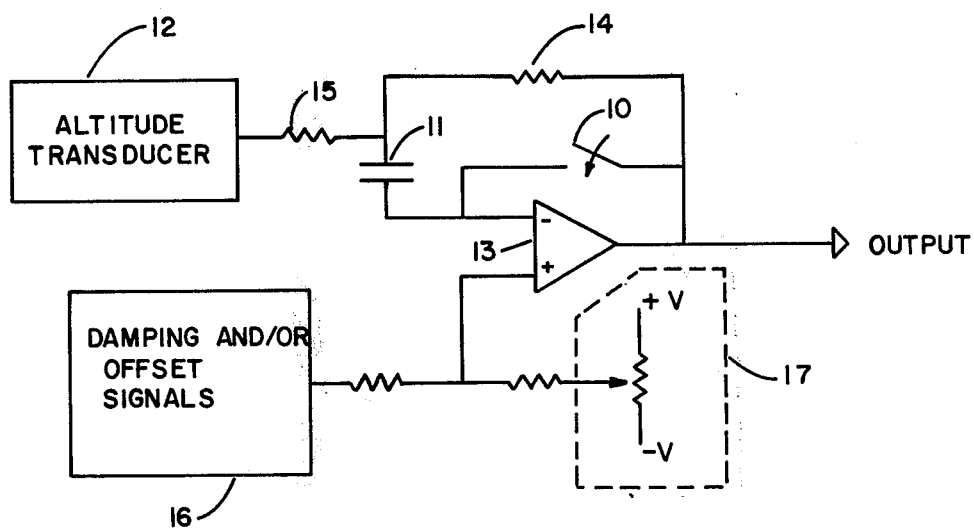
FIG. 2 is a circuit schematic of a constant altitude auto pilot with additional inputs for biasing the altitude signal and for control loop stability.

FIG. 2 shows how damping and offset signals 16 may be mixed and added to the altitude signal. If needed, a constant rate ramp voltage signal 17 which matches the bleed rate of the capacitor may be used as an input to extend the long term stability of the invention.

Obviously, many modifications and variations of the present invention are possible in the light of the above teachings. It is therefore to be understood that within the scope of the appended claims the invention may be practiced otherwise than as specifically described.

What is claimed is:

1. A constant altitude hold auto-pilot which samples an altitude electronically and produces error output voltages proportional to the changes in altitude which are used to command a control system of an aircraft, comprising:

an altitude transducer means for providing an analog altitude output signal corresponding to the altitude of an aircraft;

a first resistor connected in series with said transducer means;

a high impedance input operational amplifier having a positive input, a negative input and an output;

a second resistor connected between the output of said first resistor and the output of said operational amplifier;

a low leakage capacitor connected between the output of said first resistor and the negative input of said operational amplifier; and, a switch connected between the negative input of said operational amplifier and the output of said operational amplifier, and said switch, when closed, allows said capacitor to charge to a voltage proportionate to the output of said transducer by the operating characteristics of said amplifier, and said switch, when opened on an externally applied altitude hold command signal, allows the capacitor to be in series with the present altitude signal thereby causing the error signal to be amplified by said operational amplifier.

2. The device of claim 1 including damping and offset signal means connected to the positive input of said operational amplifier for providing control loop stability.

3. The device of claim 1 including a bias setting means comprising a constant rate ramp signal means which matches the bleed rate of said capacitor, said bias setting means being connected to the positive input of said operational amplifier.

4. The device of claim 2 including a bias setting means comprising a constant rate ramp signal means which matches the bleed rate of said capacitor, said bias setting means being connected to the positive input of said operational amplifier.

* * * * *